US011268579B2

(12) United States Patent
Hahn et al.

(10) Patent No.: US 11,268,579 B2
(45) Date of Patent: Mar. 8, 2022

(54) HYBRID DUAL-CLUTCH TRANSMISSION

(71) Applicant: DAIMLER AG, Stuttgart (DE)

(72) Inventors: Peter Hahn, Stuttgart (DE); Stefan Sperrfechter, Donzdorf (DE); Tobias Haerter, Stuttgart (DE); Juergen Schweitzer, Filderstadt (DE); Jonathan Zeibig, Remshalden (DE); Andreas Kolb, Wernau (DE)

(73) Assignee: DAIMLER AG, Stuttgart (DE)

( * ) Notice: Subject to any disclaimer, the term of this patent is extended or adjusted under 35 U.S.C. 154(b) by 0 days.

(21) Appl. No.: 17/292,772

(22) PCT Filed: Sep. 27, 2019

(86) PCT No.: PCT/EP2019/076126
§ 371 (c)(1),
(2) Date: May 11, 2021

(87) PCT Pub. No.: WO2020/099012
PCT Pub. Date: May 22, 2020

(65) Prior Publication Data
US 2021/0396278 A1    Dec. 23, 2021

(30) Foreign Application Priority Data
Nov. 12, 2018  (DE) ............... 10 2018 008 912.7

(51) Int. Cl.
*F16D 25/10*  (2006.01)
*F16D 25/0638*  (2006.01)
(Continued)

(52) U.S. Cl.
CPC ........ *F16D 25/10* (2013.01); *F16D 25/0638* (2013.01); *F16D 2021/0661* (2013.01); *F16D 2121/04* (2013.01); *F16D 2121/24* (2013.01)

(58) Field of Classification Search
CPC ........ B60K 6/38; F16D 2021/06; F16D 25/10; F16D 25/0638
See application file for complete search history.

(56) References Cited

U.S. PATENT DOCUMENTS

| 8,454,468 | B2 * | 6/2013 | Janson ................. F16D 25/083 475/103 |
| 9,845,871 | B2 | 12/2017 | Iwasaki et al. |

(Continued)

FOREIGN PATENT DOCUMENTS

| DE | 102007003107 A1 * | 8/2007 | ............ B60K 6/387 |
| DE | 102007003107 A1 | 8/2007 | |

(Continued)

OTHER PUBLICATIONS

Machine translation of DE102007003107, retrieved from www.espacenet.com (Year: 2021).*

(Continued)

*Primary Examiner* — Stacey A Fluhart
(74) *Attorney, Agent, or Firm* — Patent Portfolio Builders PLLC

(57) ABSTRACT

A hybrid dual-clutch transmission includes a first countershaft sub-transmission, a second countershaft sub-transmission, a first clutch assigned to the first countershaft sub-transmission, a first actuating chamber, a first centrifugal oil chamber, a first power transmission region, a first inner lamella carrier, and a first outer lamella carrier. The transmission also includes a second clutch assigned to the second countershaft sub-transmission, a second actuating chamber, a second centrifugal oil chamber, a second power transmission region, a second inner lamella carrier, and second outer lamella carrier. The transmission further includes a third clutch to connect to an internal combustion engine and which has a third actuating chamber, a third centrifugal oil chamber, a third power transmission region, a third inner (Continued)

Figure 1:
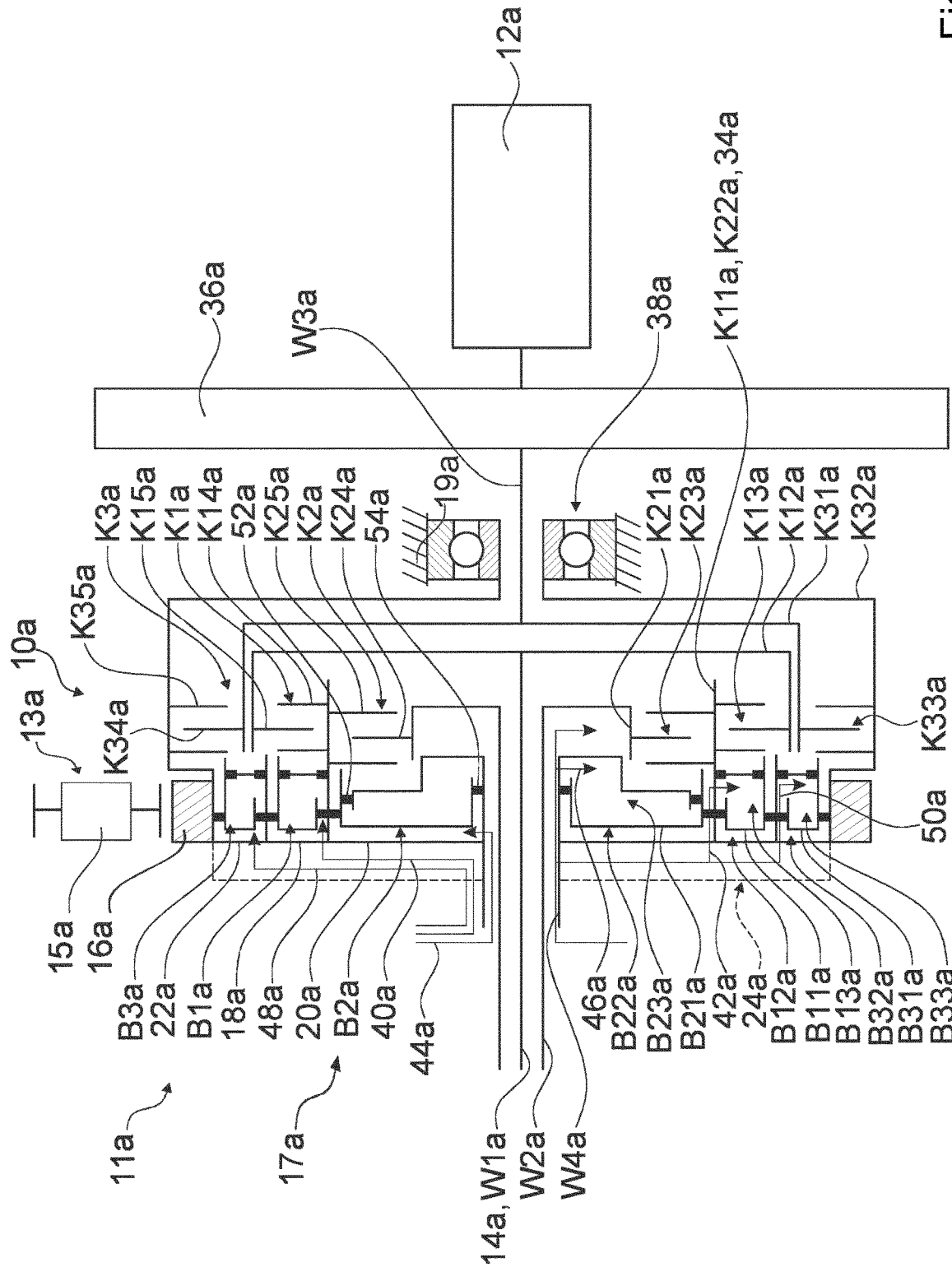

lamella carrier, and a third outer lamella carrier. The first, second, and third power transmission regions are arranged radially stacked one on top of the other and axially at least partially overlapping.

10 Claims, 2 Drawing Sheets

(51) Int. Cl.
    *F16D 121/24*      (2012.01)
    *F16D 121/04*      (2012.01)
    *F16D 21/06*      (2006.01)

(56) References Cited

U.S. PATENT DOCUMENTS

| | | | | |
|---|---|---|---|---|
| 2011/0240384 A1* | 10/2011 | Roske | ............... | B60K 6/48 |
| | | | | 180/65.22 |
| 2014/0371023 A1* | 12/2014 | Janson | ............... | F16H 61/0265 |
| | | | | 475/275 |
| 2017/0261045 A1* | 9/2017 | Chamberlin | ............... | H02K 9/19 |
| 2017/0267092 A1* | 9/2017 | Thackwell | ............... | B60K 6/547 |
| 2019/0344656 A1 | 11/2019 | Obergasser et al. | | |

FOREIGN PATENT DOCUMENTS

| | | |
|---|---|---|
| DE | 102015004794 A1 | 10/2015 |
| DE | 102016218264 A1 | 3/2018 |
| DE | 102017104446 A1 | 9/2018 |

OTHER PUBLICATIONS

International Search Report dated Dec. 18, 2019 in related/corresponding International Application No. PCT/EP2019/076126.

Office Action dated May 31, 2019 in related/corresponding DE Application No. 10 2018 008 912.7.

Written Opinion dated Dec. 18, 2019 in related/corresponding International Application No. PCT/EP2019/076126.

* cited by examiner

HYBRID DUAL-CLUTCH TRANSMISSION

BACKGROUND AND SUMMARY OF THE INVENTION

Exemplary embodiments of the invention relate to a hybrid dual-clutch transmission.

Hybrid dual-clutch transmissions are already known from DE 10 2007 003 107 A1 and from the generic DE 10 2016 218 264 A1, having a first countershaft sub-transmission, a second countershaft sub-transmission, a first clutch assigned to the first countershaft sub-transmission and which has a first actuating chamber, a first centrifugal oil chamber, a first power transmission region, a first inner lamella carrier and a first outer lamella carrier, a second clutch assigned to the second countershaft sub-transmission and which has a second actuating chamber, a second centrifugal oil chamber, a second power transmission region, a second inner lamella carrier and a second outer lamella carrier, and a third clutch for connecting to an internal combustion engine, which has a third actuating chamber, a third centrifugal oil chamber, a third power transmission region, a third inner lamella carrier and a third outer lamella carrier, wherein the first power transmission region, the second power transmission region and the third power transmission region are arranged radially stacked one above the other and axially at least partially overlapping, wherein the third clutch is arranged radially outwardly relative to the first clutch and the second clutch, wherein the first clutch, the second clutch and the third clutch are arranged concentrically around a main axis of rotation.

Furthermore, a planetary transmission having an arrangement of three radially stacked lamella clutches is know from DE 10 2015 004 794 A1, wherein not only the power transmission regions of these three lamella clutches are arranged axially overlapping one another, but wherein also the centrifugal oil chambers of these three lamella clutches are arranged axially overlapping one another.

Exemplary embodiments of the invention are directed to a generic device having improved properties, in particular with regard to an overall compact design and simple oil distribution.

The invention is based on a hybrid dual-clutch transmission having a first countershaft sub-transmission, having a second countershaft sub-transmission, having a first clutch assigned to the first countershaft sub-transmission and which has a first actuating chamber, a first centrifugal oil chamber, a first power transmission region, a first inner lamella carrier and a first outer lamella carrier, having a second clutch assigned to the second countershaft sub-transmission and which has a second actuating chamber, a second centrifugal oil chamber, a second power transmission region, a second inner lamella carrier and a second outer lamella carrier. The first clutch and the second clutch thus together form a dual clutch.

The two countershaft sub-transmissions each have an input shaft, namely a first input shaft and a second input shaft arranged coaxially with respect to the first input shaft.

The first input shaft is non-rotatably connected to a first secondary side of the first clutch.

The second input shaft is non-rotatably connected to a second secondary side of the second clutch.

A first primary side of the first clutch is non-rotatably connected to a second primary side of the second clutch. The two primary sides form a common primary side of the dual clutch in a known manner.

The term primary side of a clutch means a clutch half of the clutch arranged upstream in the torque flow. The term secondary side of the clutch means a clutch half of the clutch arranged downstream in the torque flow.

Furthermore, a third clutch is assumed. The third clutch is provided for connecting the hybrid dual-clutch transmission to an internal combustion engine. The third clutch has a third actuating chamber, a third centrifugal oil chamber, a third power transmission region, a third inner lamella carrier and a third outer lamella carrier. A third secondary side of the third clutch is thereby non-rotatably connected to the common primary side of the dual clutch.

As known in the prior art, it is assumed that the first actuating chamber, the second actuating chamber and the third actuating chamber are arranged radially stacked one above the other.

The dual clutch and the third clutch are configured such that the first power transmission region, the second power transmission region, and the third power transmission region are arranged radially stacked one on top of the other and axially at least partially overlapping, wherein the third clutch is arranged radially outwardly with respect to the first clutch and the second clutch, wherein the first clutch, the second clutch, and the third clutch are arranged coaxially with respect to a main axis of rotation.

In a known manner, the first countershaft sub-transmission comprises the first input shaft and first gears that are non-rotatably coupled to the first input shaft or can be non-rotatably coupled to the first input shaft. Furthermore, the first countershaft sub-transmission comprises first countershaft gears arranged coaxially with respect to a first countershaft, wherein each of the first countershaft gears meshes with one of the first gears.

Correspondingly, the second countershaft sub-transmission comprises the second input shaft and second gears that are non-rotatably coupled to the second input shaft or can be non-rotatably coupled to the second input shaft. Furthermore, the second countershaft sub-transmission comprises second countershaft gears arranged coaxially with respect to the first countershaft or coaxially with a second countershaft, if present, wherein each of the second countershaft gears meshes with one of the second gears.

The first countershaft and the second countershaft, if present, are arranged parallel and axially offset to the first or second input shafts.

The hybrid dual clutch transmission further has a drive shaft. The drive shaft is non-rotatably connected to a third primary side of the third clutch and is provided to be driven by an internal combustion engine. For this purpose, the drive shaft is either non-rotatably connected to a crankshaft of the internal combustion engine or quasi-non-rotatably connected to the crankshaft, for example by means of a vibration damper.

The third primary side is formed by the third inner lamella carrier. The third secondary side is formed by the third outer lamella carrier.

It is further assumed that an electric motor of the hybrid dual-clutch transmission is coupled to the common primary side of the dual clutch in such a way that torques, starting from the electric motor, can be introduced into the dual clutch transmission exclusively via the primary side of the dual clutch.

According to the invention, the hybrid dual clutch transmission has a connecting element, preferably a drive gearwheel, for connecting the electric motor, which is non-rotatably connected to the first inner lamella carrier, the second outer lamella carrier, and the third outer lamella carrier. In this case, a rotor of the electric motor is connected to the connecting element in a torque-transmitting manner, wherein the rotor is arranged axially parallel and not coaxially to the drive gearwheel. The rotor is connected to the connection element, for example, by one or more spur gear stages or by a belt drive.

Furthermore, according to the invention, the first centrifugal oil chamber, the second oil centrifugal chamber, and the third oil centrifugal chamber are arranged radially stacked one on top of the other. Furthermore, the first centrifugal oil chamber, the second centrifugal oil chamber, and the third centrifugal oil chamber are arranged axially at least partially overlapping.

The hybrid dual-clutch transmission comprises a main axis of rotation and at least one secondary axis of rotation. In this context, a "main axis of rotation" is to be understood, in particular, as an axis of rotation defined by the drive shaft or the input shafts. Preferably, this is to be understood to mean, in particular, an axis of rotation defined by an input shaft on the drive side of the hybrid dual clutch transmission. A "secondary axis of rotation" is to be understood, in particular, as an axis of rotation offset parallel to the main axis of rotation, in particular of the first countershaft. A first secondary axis of rotation is assigned to the first countershaft. A second secondary axis of rotation is assigned to the second countershaft, if present.

The terms "axial" and "radial" refer to the main axis of rotation.

An axially at least partially overlapping arrangement of two elements is understood to mean that the two elements are arranged at least partially in the same axial region. In other words, a first element is arranged partially overlapping a second element if at least a part of the first element and a part of the second element are arranged in the same axial region. In this case, the axial region is defined by a coordinate interval on a spatial axis coinciding with the main axis of rotation, wherein the coordinates can be arbitrary with respect to the other two spatial axes.

A radially stacked arrangement of two elements is understood to mean that the two elements are arranged at least partially radially without overlapping each other. In other words, a first element is arranged radially stacked on top of a second element if the first element is arranged at least partially in a different radial region from the second element. The radial region is thereby defined by a radius interval, wherein the coordinate can be arbitrary with respect to the main axis of rotation.

The first clutch is designed as a first lamella clutch. Preferably, the first inner lamella carrier carries at least one first inner lamella and particularly preferably a plurality of first inner lamellae. Furthermore, the first outer lamella carrier preferably carries at least one first outer lamella and particularly preferably a plurality of first outer lamellae. Preferably, the at least one first inner lamella and the at least one first outer lamella form, particularly preferably in an alternating arrangement, a first lamella set. In particular, the first lamella set forms the first power transmission region. A "power transmission region" is to be understood, in particular, as a region of a clutch in which, at least in an actuated state of the clutch, a power transmission, in particular a positive and/or frictional power transmission, takes place between an input side of the respectively assigned clutch and the output side of the respectively assigned clutch. Preferably, the power transmission region is formed by a region of the inner lamellae and the outer lamellae of the respective clutch. In particular, the power transmission region is formed by a lamella set. The second clutch is, in particular, designed as a second lamella clutch. Preferably, the second inner lamella carrier carries at least one second inner lamella and particularly preferably a plurality of second inner lamellae. Furthermore, the second outer lamella carrier preferably carries at least one second outer lamella and particularly preferably a plurality of second outer lamellae. Preferably, the at least one second inner lamella and the at least one second outer lamella form, particularly preferably in an alternating arrangement, a second lamella set. In particular, the second lamella set forms the second power transmission region. The third clutch is designed as a separating clutch. A "separating clutch" is to be understood, in particular, as a clutch which is provided to uncouple the internal combustion engine from all countershaft sub-transmissions. "Provided" is to be understood, in particular, to mean specifically designed and/or specifically equipped. An object being provided for a specific function is to be understood to mean, in particular, that the object fulfils and/or performs this specific function in a least one application and/or operating state.

Preferably, the third clutch is designed for optimum drag torque. In particular, the third clutch is designed as a third lamella clutch. Preferably, the third inner lamella carrier carries at least one third inner lamella and particularly preferably a plurality of third inner lamellae. Furthermore, the third outer lamella carrier preferably carries at least one third outer lamella and particularly preferably a plurality of third outer lamellae. Preferably, the at least one third inner lamella and the at least one third outer lamella form a third lamella set, particularly preferably in an alternating arrangement. In particular, the third lamella set forms the third power transmission region. Preferably, the first actuating chamber is provided for actuating the first clutch. Preferably, the second actuating chamber is provided for actuating the second clutch. Preferably, the third actuating chamber is provided for actuating the third clutch.

Preferably, the first actuating chamber is arranged radially inside the third actuating chamber. Preferably, the second actuating chamber is arranged radially inside the first actuating chamber. Particularly preferably, the first actuating chamber, the second actuating chamber, and the third actuating chamber are arranged radially without overlap. By "radially without overlap", it is to be understood, in particular, that similar components, assemblies or installation spaces do not overlap in the radial direction.

Preferably, the first clutch, the second clutch, and the third clutch are arranged radially stacked one on top of the other. Preferably, the first clutch is arranged radially inside the third clutch. Preferably, the second clutch is arranged radially inside the first clutch. Preferably, the first clutch, the second clutch, and the third clutch are arranged at least substantially in the same axial extension region. "At least substantially" is to be understood, in particular, that a deviation from a predetermined value is in particular less than 25%, preferably less than 10% and particularly preferably less than 5% of the predetermined value. Preferably, the first power transmission region is arranged radially within the third power transmission region. Preferably, the second power transmission region is arranged radially inside the first power transmission region. Preferably, the first power transmission region, the second power transmission region, and the third power transmission region are arranged radially without overlap. Preferably, the first power transmission region, the second power transmission region, and the third power transmission region are arranged at least substantially in the same axial extension region.

The hybrid dual-clutch transmission comprises the electric motor. In particular, an axis of rotation of the electric motor is designed not to be coaxial with respect to the main axis of rotation. Preferably, the axis of rotation of the electric motor is aligned axially in parallel to the main axis of rotation. The drive gearwheel is provided, in particular, for a, in particular torque-transmitting, connection of the electric motor to the dual-clutch transmission. As an alternative to the drive gearwheel, the hybrid dual clutch transmission can have a chain wheel, a belt pulley, or similar.

A non-rotatable connection of two elements is to be understood to mean that the two elements are arranged coaxially with respect to each other and are connected in such a way that they rotate with the same angular velocity. A non-rotatable connection of an element to a housing part is to be understood to mean that the element is connected to the housing in such a way that it cannot be twisted with respect to the housing. In the context of the present invention, a connection between two elements is also referred to as non-rotatable if a vibration damper is applied between the two elements, which allows slight rotational relative movements between the two elements purely for the purpose of vibration damping.

Preferably, the hybrid dual-clutch transmission is coupled to at least one dual mass flywheel. Preferably, the dual mass flywheel is provided to reduce torsional vibrations of the internal combustion engine. By means of the design according to the invention, a compact design of the hybrid dual-clutch transmission having an advantageously small axial overall length can be achieved. By means of the design according to the invention, advantageously high installation space efficiency can be achieved. Furthermore, an advantageous dual-clutch design can be made possible. Particularly advantageously, an internal combustion engine can be decoupled from the hybrid dual-clutch transmission in an electric driving mode by means of the third clutch. The design according to the invention advantageously enables a compact integration of the separating clutch into the dual clutch, in particular, for a P2 hybrid application.

Furthermore, it is proposed that the first actuating chamber, the second actuating chamber, and the third actuating chamber be arranged axially at least partially overlapping. "Axially overlapping" is to be understood, in particular, to mean that similar components, assemblies or installation spaces overlap axially when viewed from the main axis of rotation. Preferably, it is to be understood, in particular, that at least one straight line extending radially from the main axis of rotation intersects all of the similar components, assemblies or installation spaces. Preferably, the first actuating chamber, the second actuating chamber, and the third actuating chamber are arranged at least substantially in the same axial extension region. This design makes it possible to achieve a compact construction of the hybrid dual-clutch transmission having an advantageously small axial overall length.

Preferably, the first centrifugal oil chamber is arranged radially inside the third oil centrifugal chamber. Preferably, the second centrifugal oil chamber is arranged radially inside the first centrifugal oil chamber. Preferably, the first centrifugal oil chamber, the second centrifugal oil chamber, and the third centrifugal oil chamber are arranged radially without overlap. This design makes it possible, in particular, to achieve a compact construction of the hybrid dual-clutch transmission having an advantageously small axial overall length.

Particularly preferably, the first centrifugal oil chamber, the second centrifugal oil chamber, and the third centrifugal oil chamber are arranged substantially in the same axial extension region. This design makes is possible, in particular, to achieve a compact construction of the hybrid dual-clutch transmission having an advantageously small axial overall length.

It is further proposed that the first actuating chamber has a first boundary wall on a side facing away from the first power transmission region in the axial direction, the second actuating chamber has a second boundary wall on a side facing away from the second power transmission region in the axial direction, and the third actuating chamber has a third boundary wall on a side facing away from the third power transmission region in the axial direction, wherein the first boundary wall surrounds the second boundary wall radially without overlap and the third boundary wall surrounds the first boundary wall radially without overlap. An "axial direction" is to be understood, in particular, as a direction along, in particular parallel to, the main axis of rotation. A "boundary wall" is to be understood, in particular, as an element delimiting an installation space, in particular an actuating chamber, in at least one direction.

Preferably, the first boundary wall, the second boundary wall, and the third boundary wall are arranged concentrically with respect to the main axis of rotation.

Preferably, the first boundary wall, in particular a main extension plane of the first boundary wall, is arranged at least substantially orthogonally to the main axis of rotation. In this context, "at least substantially orthogonally" is to be understood, in particular, to mean that an angular deviation of an orientation of a boundary wall orthogonal to the main axis of rotation is in particular less than 30 degrees, preferably less than 10 degrees and particularly preferably less than 5 degrees. Preferably, the second boundary wall is arranged at least substantially orthogonally to the main axis of rotation. Preferably, the third boundary wall is arranged at least substantially orthogonally to the main axis of rotation. Preferably, the first boundary wall is at least substantially flat. In this context, "at least substantially flat" is to be understood, in particular, to mean that a difference between a minimum distance and a maximum distance orthogonal to a main extension plane of a boundary wall is in particular less than 5 mm, preferably less than 2 mm and particularly preferably less than 1 mm. The second boundary wall is preferably at least substantially flat. The third boundary wall is preferably at least substantially flat. Preferably, the first boundary wall and the third boundary wall are arranged in a plane. Particularly preferably, the first boundary wall, the second boundary wall, and the third boundary wall are arranged in a plane.

Preferably, the first boundary wall, the second boundary wall, and the third boundary wall are arranged radially adjacent to one another. Preferably, the three boundary walls each extend substantially in a radial direction.

Preferably, the first boundary wall, the second boundary wall, and the third boundary wall form a common boundary wall.

A "main extension plane" of a structural unit is to be understood, in particular, as a plane which is parallel to a largest side surface of a smallest imagined cuboid that just completely encloses the structural unit, and in particular runs through the center of the cuboid. By means of this design, an advantageous boundary of the actuating chamber is achieved. Furthermore, a boundary wall enables advantageous access to an actuating chamber from a side facing away from a power transmission region in the axial direction.

It is further proposed that the hybrid dual-clutch transmission have a plate unit arranged concentrically with respect to the main axis of rotation and which comprises the first boundary wall, the second boundary wall, and the third boundary wall. The first boundary wall, the second boundary wall, and the third boundary wall are preferably each formed as a plate segment of the plate unit. Preferably, the first boundary wall, the second boundary wall, and the third boundary wall each form an annular boundary region of the plate unit.

A "plate unit" is, in particular, to be understood to mean a round, in particular rotationally symmetrical with respect to its outer contours, and substantially flat unit that is at least provided to form at least one boundary wall to at least one actuating chamber. In this context, "substantially flat" is to be understood, in particular, to mean that a maximum axial extension of the plate unit is in particular less than 30%, preferably less than 20%, and particularly preferably less than 10% of a diameter of the plate unit. Preferably, the plate unit is formed in one piece.

The term "integrally" is, in particular, to be understood to mean at least materially bonded, for example by a welding process, an adhesive process, an injection process, and/or another process appearing to the person skilled in the art to be reasonable, and/or advantageously formed in one piece, such as by manufacturing from a casting and/or by manufacturing in a single- or multi-component injection process, for example, and advantageously from a single blank. Preferably, the plate unit is formed as a forged component.

In principle, the plate unit can also be formed in several parts, wherein in particular the first boundary wall, the second boundary wall and the third boundary wall are non-rotatably connected to one another.

Preferably, the plate unit is non-rotatably connected to the third outer lamella carrier of the third clutch. The plate unit is preferably provided for a radial distribution of at least one actuating oil and/or at least one centrifugal oil. In principle, it is also conceivable that the first boundary wall is arranged at a distance from the second boundary wall and/or the first boundary wall is arranged at a distance from the third boundary wall, wherein the plate unit has a distance segment between the first actuating chamber and the second actuating chamber and/or a further distance segment between the first actuating chamber and the third actuating chamber. This embodiment allows an actuating oil to be advantageously supplied radially to an actuating chamber. Furthermore, a centrifugal oil can be advantageously supplied radially to a centrifugal oil chamber. An actuating oil and/or a centrifugal oil can advantageously be supplied from a side of the hybrid dual-clutch transmission facing away from the internal combustion engine. In particular, the plate unit enables a compact design of the hybrid dual-clutch transmission with an advantageously short axial overall length. As a result, advantageously high installation space efficiency can be achieved.

Furthermore, it is proposed that the plate unit have a first oil channel which is provided to supply an actuating oil to the first actuating chamber and which extends in a radial direction within the plate unit. A "radial direction" is, in particular, to be understood to mean a direction orthogonal to the main axis of rotation. Preferably, the first oil channel is at least partially configured as a first radial bore. In particular, the plate unit has a first outlet opening provided to connect the first oil channel to the first actuating chamber. The first outlet opening is, in particular, formed by an axial bore projecting into the first radial bore. This design allows the actuating oil to be advantageously supplied to the first actuating chamber extending radially in the plate unit. Furthermore, the actuating oil can thereby be advantageously supplied to the first actuating chamber from a side of the hybrid dual-clutch transmission facing away from the internal combustion engine.

Furthermore, it is proposed that the plate unit comprise a second oil channel which is provided for supplying an actuating oil to the second actuating chamber. Preferably, the second oil channel extends at least in a radial direction within the plate unit. Preferably, the second oil channel is at least partially configured as a second radial bore. In particular, the plate unit has a second outlet opening which is provided to connect the second oil channel to the second actuating chamber. The second outlet opening is, in particular, formed by an axial bore projecting into the second radial bore. This design allows the actuating oil to be advantageously supplied to the second actuating chamber axially or radially. Furthermore, the actuating oil can thereby be advantageously supplied to the second actuating chamber from a side of the hybrid dual-clutch transmission facing away from the internal combustion engine.

It is further proposed that the plate unit have a third oil channel which is provided for supplying an actuating oil to the third actuating chamber and which extends in radial direction within the plate unit. Preferably, the third oil channel is at least partially designed as a third radial bore. In particular, the plate unit has a third outlet opening which is provided to connect the third oil channel to the third actuating chamber. The third outlet opening is, in particular, formed by an axial bore projecting into the third radial bore. This design allows the actuating oil to be advantageously supplied radially to the third actuating chamber. Furthermore, the actuating oil can thereby be advantageously supplied to the third actuating chamber from a side of the hybrid dual-clutch transmission facing away from the internal combustion engine.

Furthermore, it is proposed that the plate unit have a radially extending centrifugal channel which is provided to supply a centrifugal oil to the first centrifugal oil chamber and/or the second centrifugal oil chamber and/or the third centrifugal oil chamber. In particular, the centrifugal channel is provided to supply the centrifugal oil to the first centrifugal oil chamber and the third centrifugal oil chamber. Preferably, the centrifugal oil chamber is at least partially designed as a fourth radial bore. In particular, the plate unit has a fourth outlet opening provided to connect the centrifugal channel to the first centrifugal oil chamber. The fourth outlet opening is, in particular, formed by an axial bore projecting into the fourth radial bore. In particular, the plate unit has a fifth outlet opening designed to connect the centrifugal channel to the third centrifugal oil chamber. In particular, the fifth outlet opening is formed by an axial bore projecting into the fourth radial bore. This design allows the centrifugal oil to be advantageously supplied radially to a centrifugal oil chamber. Furthermore, the centrifugal oil can thereby be advantageously supplied to a centrifugal oil chamber from a side of the hybrid dual-clutch transmission facing away from the internal combustion engine.

Furthermore, it is proposed that the drive gearwheel radially surrounds the plate unit and is arranged axially adjacent to or axially overlapping the plate unit. Preferably, the drive gearwheel is welded to the plate unit or is formed integrally with the plate unit. In this context, "radially surrounds" is to be understood, in particular, to mean that the drive gearwheel is arranged radially outside the plate unit. Preferably, this is to be understood, in particular, to mean that a minimum radial distance of the drive gearwheel from the main axis of rotation is greater than or equal to a maximum radial distance of the plate unit from the main axis of rotation. In this context, "axially adjacent" is to be understood, in particular, to mean that the drive gearwheel axially abuts the plate unit. Preferably, this is to be understood, in particular, to mean that opposite end faces of the drive gearwheel and the plate unit are in contact with each other. This design allows the electric motor to be advantageously integrated into the hybrid dual-clutch transmission. Thus, a P2 hybrid connection is advantageously implemented. This design advantageously enables an electric driving mode.

It is further proposed that the hybrid dual-clutch transmission have a cylinder unit arranged concentrically with respect to the main axis of rotation, which cylinder unit is formed on a radially outer side as the first inner lamella carrier of the first clutch and on a radially inner side as the second outer lamella carrier of the second clutch, wherein the cylinder unit is radially non-rotatably connected to the plate unit in a region between the first boundary wall and the second boundary wall. A "cylinder unit" is to be understood, in particular, to mean a cylindrical, in particular a hollow cylindrical, element arranged concentrically with respect to the main axis of rotation and is preferably integrally connected to at least one further element. Preferably, the cylinder unit is connected to the plate unit in a materially bonded, positive-locking, and/or frictional manner. Preferably, the cylinder unit is formed in one piece. The cylinder unit can be cranked. This embodiment advantageously reduces a variety of components of the hybrid dual-clutch transmission.

Further advantages emerge from the following description of the figures. The figures depict two exemplary embodiments of the invention. The figures, the description of the figures and the claims contain numerous features in combination. The person skilled in the art will expediently also consider the features individually and combine them to form useful further combinations.

BRIEF DESCRIPTION OF THE DRAWING FIGURES

Figure 2:
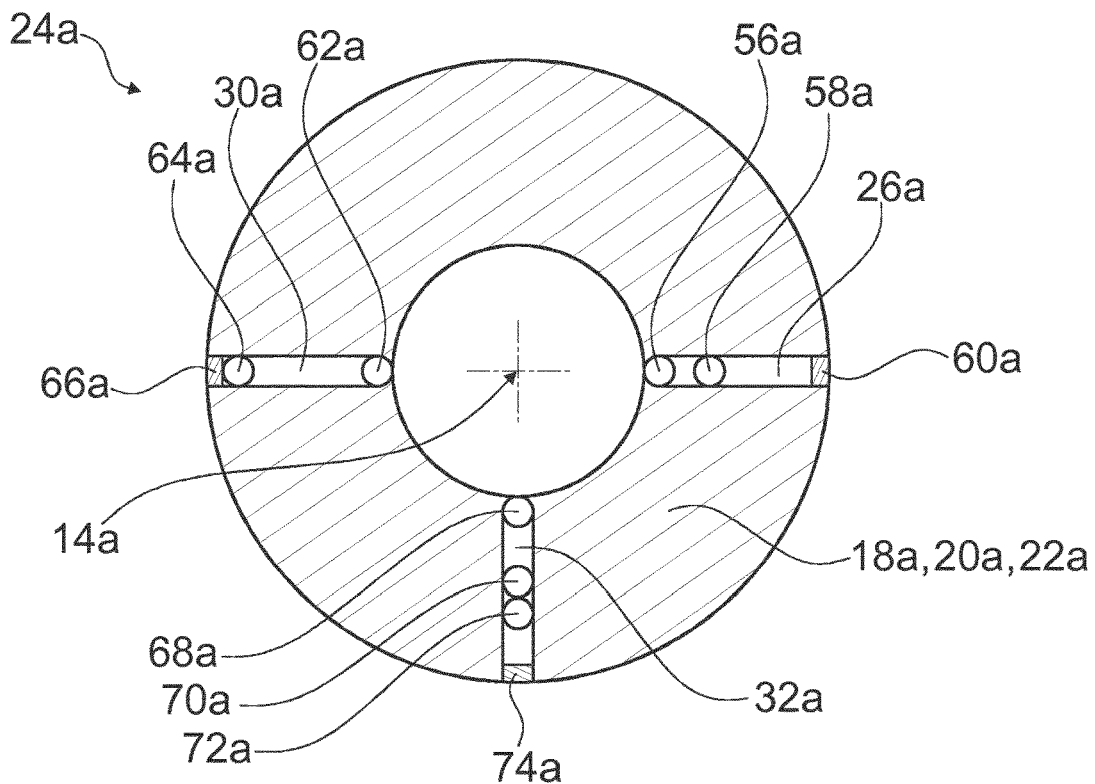
Figure 3:
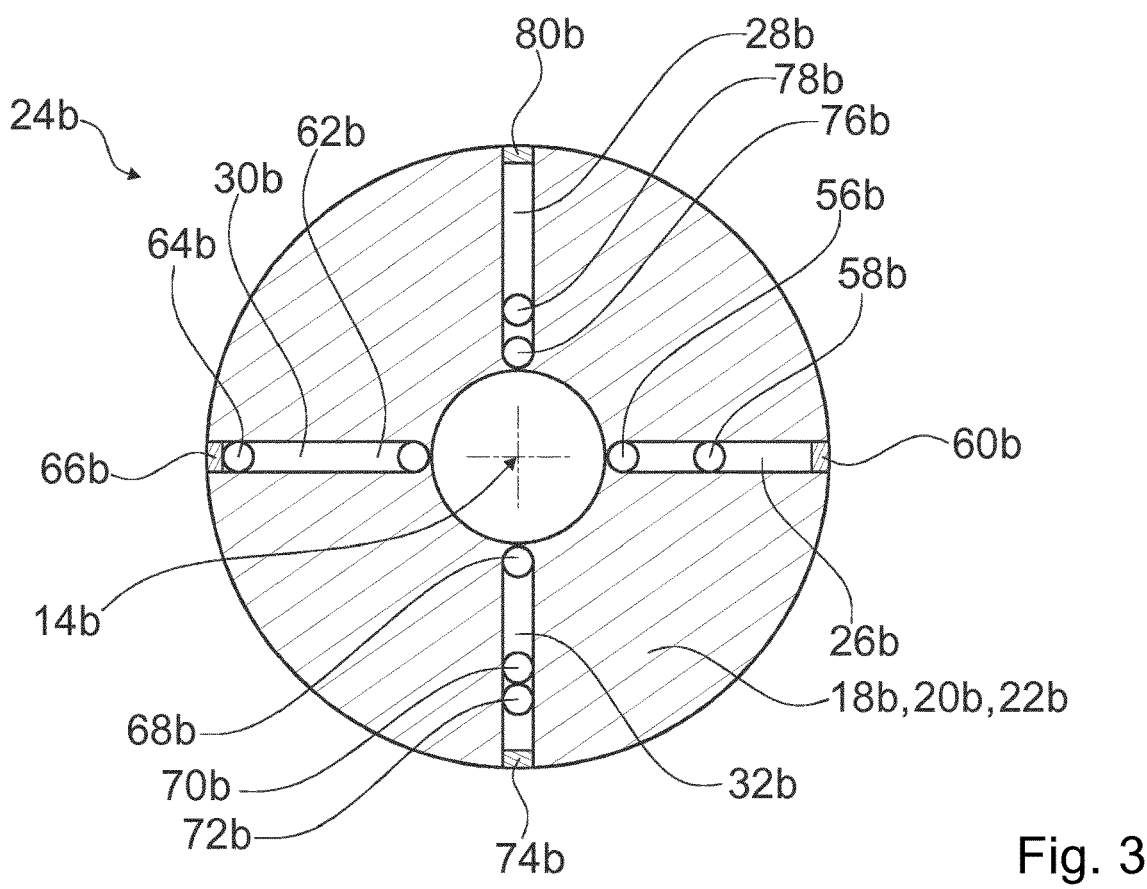

Here are shown:

FIG. 1 a schematic depiction of a hybrid dual-clutch transmission according to the invention in a first exemplary embodiment, FIG. 2 a schematic sectional depiction of a plate unit in the first exemplary embodiment, and FIG. 3 a schematic sectional depiction of a plate unit in a second exemplary embodiment.

DETAILED DESCRIPTION

FIGS. 1 and 2 show a first exemplary embodiment of the hybrid dual-clutch transmission $10a$ according to the invention.

FIG. 1 shows a schematic representation of the hybrid dual-clutch transmission $10a$ according to the invention in the first exemplary embodiment. The hybrid dual-clutch transmission $10a$ comprises a dual-clutch transmission $11a$. The dual-clutch transmission $11a$ comprises a dual clutch $17a$. The dual-clutch transmission $11a$ comprises a first only partially depicted countershaft sub-transmission. The hybrid dual-clutch transmission $10a$ comprises a second only partially depicted countershaft sub-transmission. The first countershaft sub-transmission is provided for switching odd-numbered gears. The first countershaft sub-transmission has a first input shaft $W1a$. The first input shaft $W1a$ is designed as an inner input shaft. The first input shaft $W1a$ is formed as a solid shaft. The second countershaft sub-transmission is provided for switching even-numbered gears. The second countershaft sub-transmission has a second input shaft $W2a$. The second input shaft $W2a$ is formed as a hollow shaft. The second input shaft $W2a$ is arranged coaxially to the first input shaft $W1a$.

The first countershaft sub-transmission and the second countershaft sub-transmission have several switching units not depicted in more detail. The switching units are provided for establishing switchable connections between transmission shafts, fixed gears, and/or idler gears of the countershaft sub-transmission. In principle, however, it is also conceivable that the first countershaft sub-transmission is provided for switching even-numbered gears and the second countershaft sub-transmission is provided for switching odd-numbered gears. Advantageously, the second input shaft $W2a$ is arranged radially outside the first input shaft $W1a$ and/or the first input shaft $W1a$ is designed as an inner input shaft and the second input shaft $W2a$ as an outer input shaft. This can advantageously achieve high installation space efficiency. Furthermore, an advantageous dual-clutch design can be made possible. The hybrid dual-clutch transmission $10a$ has a drive shaft $W3a$. The drive shaft $W3a$ is coupled to a dual mass flywheel $36a$. The dual mass flywheel $36a$ is coupled to an internal combustion engine $12a$. The dual mass flywheel $36a$ is provided to reduce torsional vibrations of the internal combustion engine $12a$. The drive shaft $W3a$ is provided to be driven by the internal combustion engine $12a$. The hybrid dual-clutch transmission $10a$ comprises a main axis of rotation $14a$. The first input shaft $W1a$, the second input shaft $W2a$, and the drive shaft $W3a$ are arranged coaxially to the main axis of rotation $14a$.

The hybrid dual-clutch transmission $10a$ comprises a housing $19a$, which is only symbolically indicated in the figure. The hybrid dual-clutch transmission $10a$ comprises an electric motor $13a$, which comprises a rotor $15a$. The electric motor $13a$ is not arranged coaxially to the main axis of rotation $14a$.

The hybrid dual-clutch transmission $10a$ has a drive element $16a$ configured as a drive gearwheel. The drive element $16a$ is provided for a torque-transmitting connection of the electric motor $13a$ to the hybrid dual-clutch transmission $10a$. In principle, the hybrid dual-clutch transmission $10a$ can have a chain wheel or a belt pulley as the drive element $16a$ instead of the drive gearwheel.

The rotor $15a$ of the electric motor $13a$ is connected to a primary side of the dual clutch $17a$ via a spur gear stage.

The hybrid dual-clutch transmission $10a$ has a first clutch $K1a$. The first clutch $K1a$ is assigned to the first countershaft sub-transmission. The first clutch $K1a$ is designed as a lamella clutch. The first clutch $K1a$ has a first inner lamella carrier $K11a$. The first inner lamella carrier $K11a$ carries a plurality of first inner lamellae $K14a$, only some of which are depicted in FIG. 1. The first inner lamellae $K14a$ are connected to the first inner lamella carrier $K11a$ in a non-rotatable and axially displaceable manner. The first clutch $K1a$ has a first outer lamella carrier $K12a$. The first outer lamella carrier $K12a$ is non-rotatably connected to the first input shaft $W1a$ of the first countershaft sub-transmission. The first outer lamella carrier $K12a$ carries a plurality of first outer lamellae $K15a$, only some of which are depicted in FIG. 1. The first outer lamellae $K15a$ are connected to the first outer lamella carrier $K12a$ in a non-rotatable and axially displaceable manner. The first inner lamellae $K14a$ and the first outer lamellae $K15a$ form a first lamella set. The first inner lamellae $K14a$ and the first outer lamellae $K15a$ mutually engage with each other. The first clutch K1a has a first power transmission region K13a. The first lamella set forms the first power transmission region K13a.

The hybrid dual-clutch transmission 10a has a second clutch K2a. The second clutch K2a is assigned to the second countershaft sub-transmission. The second clutch K2a is designed as a lamella clutch. The second clutch K2a has a second inner lamella carrier K21a. The second inner lamella carrier K21a is non-rotatably connected to the second input shaft W2a of the second countershaft sub-transmission. The second inner lamella carrier K21a carries a plurality of second inner lamellae K24a, only some of which are depicted in FIG. 1. The second inner lamellae K24a are connected to the second inner lamella carrier K21a in a non-rotatable and axially displaceable manner. The second clutch K2a has a second outer lamella carrier K22a. The second outer lamella carrier K22a carries a plurality of second outer lamellae K25a, only some of which are depicted in FIG. 1. The second outer lamellae K25a are connected to the second outer lamella carrier K22a in a non-rotatable and axially displaceable manner.

The second clutch K2a has a schematically depicted second lamella set. The second inner lamellae K24a and the second outer lamellae K25a form the second lamella set. The second inner lamellae K24a and the second outer lamellae K25a engage with each other alternately. The second clutch K2a has a second power transmission region K23a. The second lamella set forms the second power transmission region K23a.

The first clutch K1a and the second clutch K2a together form the dual clutch 17a.

The first inner lamellae carrier K11a forms a first primary side of the first clutch K1a. The second outer lamella carrier K22a forms a second primary side of the second clutch K2a.

The second outer lamella carrier K22a is non-rotatably connected to the first inner lamella carrier K11a. Together, the second outer lamella carrier K22a and the first inner lamella carrier K11a form a common primary side of the dual clutch 17a.

The first outer lamella carrier K12a, which is non-rotatably connected to the first input shaft W1a of the first countershaft sub-transmission, forms a first secondary side of the first clutch K1a.

The second inner lamella carrier K21a, which is non-rotatably connected to the second input shaft W2a of the second countershaft sub-transmission, forms a second secondary side of the second clutch K2a.

The hybrid dual-clutch transmission 10a has a third clutch K3a. The third clutch K3a is designed as a separating clutch. The third clutch K3a is provided to decouple the internal combustion engine 12a from all countershaft sub-transmissions and in particular from the electric motor 13a. The third clutch K3a is designed as a lamella clutch.

The third clutch K3a has a third inner lamella carrier K31a. The third inner lamella carrier K31a is non-rotatably connected to the drive shaft W3a. The third inner lamella carrier K31a forms a third primary side of the third clutch K3a. The third inner lamella carrier K31a carries a plurality of third inner lamella K34a, only some of which are depicted in FIG. 1. The third inner lamellae K34a are connected to the third inner lamella carrier K31a in a non-rotatable and axially displaceable manner.

The third clutch K3a has a third outer lamella carrier K32a. The third outer lamella carrier K32a forms a third secondary side of the third clutch K3a. The third outer lamella carrier K32a carries a plurality of third outer lamellae K35a, only some of which are depicted in FIG. 1. The third outer lamellae K35a are connected to the third outer lamella carrier K32a in a non-rotatable and axially displaceable manner. The third outer lamella carrier K32a is non-rotatably connected to the drive element 16a. The third clutch K3a has a schematically depicted third lamella set. The third inner lamellae K34a and the third outer lamellae K35a form the third lamella set. The third inner lamellae K34a and the third outer lamellae K35a engage with each other alternatively. The third clutch K3a has a third power transmission region K33a. The third lamella set forms the third power transmission region K33a.

The third secondary side of the third clutch K3a is non-rotatably connected to the common primary side of the dual clutch 17a.

The hybrid dual-clutch transmission 10a has a bearing 38a. The bearing 38a supports the third outer lamella carrier K32a relative to the housing 19a of the hybrid dual-clutch transmission 10a. The bearing 38a is arranged axially between the third outer lamella carrier K32a and the dual mass flywheel 36a. The bearing 38a is designed as a radial bearing, for example as a ball bearing, advantageously as a needle bearing. The bearing 38a is coupled to the third outer lamella carrier K32a. The bearing 38a is coupled to the housing of the hybrid dual-clutch transmission 10a.

The bearing 38 supports the third outer lamella carrier K32a radially against the housing 19a.

The first clutch K1a, the second clutch K2a, and the third clutch K3a are radially stacked one on top of the other. The first clutch K1a is arranged radially inside the third clutch K3a. The second clutch K2a is arranged radially inside the first clutch K1a. The first clutch K1a, the second clutch K2a, and the third clutch K3a are arranged at least substantially in the same axial extension range. The drive element 16a is non-rotatably connected to the first inner lamella carrier K11a, the second outer lamella carrier K22a, and the third outer lamella carrier K32a.

The first power transmission region K13a is arranged radially inside the third power transmission region K33a. The second power transmission region K23a is arranged radially inside the first power transmission region K13a. The first power transmission region K13a, the second power transmission region K23a, and the third power transmission region K33a are arranged radially without overlapping. The first power transmission region K13a, the second power transmission region K23a, and the third power transmission region K33a are arranged at least substantially in the same axial extension range.

The hybrid dual-clutch transmission 10a comprises a first actuating unit B1a. The first actuating unit B1a is arranged radially overlapping the first power transmission region K13a. The first actuating unit B1a is arranged axially on a side of the first power transmission region K13a facing away from the internal combustion engine 12a. The first actuating unit B1a is non-rotatably formed with the first inner lamella carrier K11a. The first actuating unit B1a is provided for hydraulically actuating the first clutch K1a. A first actuating oil flow 40a can be supplied to the first actuating unit B1a. The first actuating oil flow 40a can be supplied to the first actuating unit B1a from the side of the first actuating unit B1a facing away from the internal combustion engine 12a. A first centrifugal oil flow 42a can be supplied to the first actuating unit B1a. The first centrifugal oil flow 42a can be supplied to the first actuating unit B1a from the side of the first actuating unit B1a facing away from the internal combustion engine 12a. The first actuating unit B1a comprises a first actuating piston B11a. The first actuating piston B11a is arranged to be axially moveable. The first actuating unit B1a has a first actuating chamber B12a. The first actuating chamber B12a is arranged radially in a region of the first power transmission region K13a. The first actuating chamber B12a is arranged axially on a side of the first power transmission region K13a facing away from the internal combustion engine 12a. A first actuating oil can be supplied to the first actuating chamber B12a by means of the first actuating oil flow 40a. A first actuating oil pressure can be built up in the first actuating chamber B12a. By means of the first actuating oil pressure, an axial position of the first actuating piston B11a can be controlled. In the event of a high first actuating oil pressure, the first actuating piston B11a is provided to compress the first lamella set. In the event of a high first actuating oil pressure in the first actuating chamber B12a, the first actuating piston B11a is provided to close the first clutch K1a. In the event of a low first actuating oil pressure in the first actuating chamber B12a, a first return spring, which is not depicted in more detail, is provided for removing the first actuating piston B11a from the first clutch K1a. The first actuating piston B11a axially delimits the first actuating chamber B12a to a side facing the internal combustion engine 12a. The first actuating unit B1a further comprises a first centrifugal oil chamber B13a. The first centrifugal oil chamber B13a is arranged radially in a region of the first power transmission region K13a. The first centrifugal oil chamber B13a is arranged axially at least substantially outside the first power transmission region K13a. The first centrifugal oil chamber B13a is arranged axially on a side of the first power transmission region K13a facing away from the internal combustion engine 12a. The first centrifugal oil chamber B13a is arranged on a side of the first actuating piston B11a opposite the first actuating chamber B12a.

A first centrifugal oil can be supplied to the first oil centrifugal chamber B13a by means of the first centrifugal oil flow 42a, in particular, in an open state of the first clutch K1a. The first centrifugal oil chamber B13a is provided for centrifugal force compensation.

The hybrid dual-clutch transmission 10a comprises a second actuating unit B2a. The second actuating unit B2a is arranged radially at least partially in a region of the second power transmission region K23a. The second actuating unit B2a is arranged axially at least substantially outside the second power transmission region K23a. The second actuating unit B2a is arranged axially on a side of the second power transmission region K23a facing away from the internal combustion engine 12a. The second actuating unit B2a is non-rotatably formed with the second outer lamella carrier K22a. The second actuating unit B2a is provided for hydraulically actuating the second clutch K2a.

A second actuating oil flow 44a can be supplied to the second actuating unit B2a. The second actuating oil flow 44a can be supplied to the second actuating unit B2a from the side of the second actuating unit B2a facing away from the internal combustion engine 12a. A second centrifugal oil flow 46a can be supplied to the second actuating unit B2a. The second centrifugal oil flow 46a can be supplied to the second actuating unit B2a from the side of the second actuating unit B2a facing away from the internal combustion engine 12a. The second actuating unit B2a comprises a second actuating piston B21a. The second actuating piston B21a is arranged to be axially moveable. The second actuating unit B2a has a second actuating chamber B22a.

The second actuating chamber B22a is arranged radially at least partially in a region of the second power transmission region K23a. The second actuating chamber B22a is arranged axially at least substantially outside the second power transmission region K23a. The second actuating chamber B22a is arranged axially on a side of the second power transmission region K23a facing away from the internal combustion engine 12a. A second actuating oil can be supplied to the second actuating chamber B22a by means of the second actuating oil flow 44a. A second actuating oil pressure can be built up in the second actuating chamber B22a. By means of the second actuating oil pressure, an axial position of the second actuating piston B21a can be controlled. In the event of a high second actuating oil pressure, the second actuating piston B21a is provided to compress the second lamella set. In the event of a high second actuating oil pressure in the second actuating chamber B22a, the second actuating piston B21a is provided to close the second clutch K2a. In the event of a low second actuating oil pressure in the second actuating chamber B22a, a second return spring, which is not depicted in more detail, is provided for removing the second actuating piston B21a from the second clutch K2a. The second actuating piston B21a axially delimits the second actuating chamber B22a to a side facing the internal combustion engine 12a. The second actuating unit B2a further comprises a second centrifugal oil chamber B23a. The second centrifugal oil chamber B23a is radially arranged at least partially in a region of the second power transmission region K23a. The second centrifugal oil chamber B23a is arranged axially at least substantially outside the second power transmission region K23a. The second centrifugal oil chamber B23a is arranged axially on a side of the second power transmission region K23a facing away from the internal combustion engine 12a. The second centrifugal oil chamber B23a is arranged on a side of the second actuating piston B21a opposite the second actuating chamber B22a.

A second centrifugal oil can be supplied to the second centrifugal oil chamber B23a by means of the second centrifugal oil flow 46a, in particular, in an open state of the second clutch K2a. The second centrifugal oil chamber B23a is provided for centrifugal force compensation.

The hybrid dual-clutch transmission 10a comprises a third actuating unit B3a. The third actuating unit B3a is arranged radially at least partially in a region of the third power transmission region K33a. The third actuating unit B3a is arranged axially at least substantially outside the third power transmission region K33a. The third actuating unit B3a is arranged axially on a side of the third power transmission region K33a facing away from the internal combustion engine 12a. The third actuating unit B3a is formed non-rotatably with the third outer lamella carrier K23a. The third actuating unit B3a is provided for hydraulically actuating the third clutch K3a. A third actuating oil flow 48a can be supplied to the third actuating unit B3a. The third actuating oil flow 48a can be supplied to the third actuating unit B3a from the side of the third power transmission region K33a facing away from the internal combustion engine 12a. A third centrifugal oil flow 50a can be supplied to the third actuating unit B3a. The third centrifugal oil flow 50a can be supplied to the third actuating unit B3a from the side of the third actuating unit B3a facing away from the internal combustion engine 12a. The third actuating unit B3a comprises a third actuating piston B31a. The third actuating piston B31a is arranged to be axially moveable. The third actuating unit B3a has a third actuating chamber B32a.

A third actuating oil can be supplied to the third actuating chamber B32a by means of the third actuating oil flow 48a. A third actuating oil pressure can be built up in the third actuating chamber B32a. By means of the third actuating oil pressure, an axial position of the third actuating piston B31a can be controlled. In the event of a high third actuating oil pressure, the third actuating piston B31a is provided to compress the third lamella set. In the event of a high third actuating oil pressure in the third actuating chamber B32a, the third actuating piston B31a is provided to close the third clutch K3a. When the third actuating oil pressure in the third actuating chamber B32a is low, a third return spring, which is not depicted in more detail, is provided to move the third actuating piston B31a away from the third clutch K3a. The third actuating piston B31a axially delimits the third actuating chamber B32a to a side facing the internal combustion engine 12a.

The third actuating unit B3a further has a third centrifugal oil chamber B33a. The third centrifugal oil chamber B33a is arranged radially at least partially in a region of the third power transmission region K33a. The third centrifugal oil chamber B33a is arranged axially at least substantially outside the third power transmission region K33a. The third centrifugal oil chamber B33a is arranged axially on a side of the third power transmission region K33a facing away from the internal combustion engine 12a. The third centrifugal oil chamber B33a is arranged on a side of the third actuating piston B31 opposite to the third actuating chamber B32a. A third centrifugal oil can be supplied to the third centrifugal oil chamber B33a by means of the third centrifugal oil flow 50a, in particular, in an open state of the third clutch K3a. The third centrifugal oil chamber B33a is provided for centrifugal force compensation.

The first actuating chamber B12a, the second actuating chamber B22a, and the third actuating chamber B32a are arranged radially stacked one on top of the other. The first actuating chamber B12a is arranged radially inside the third actuating chamber B32a. The second actuating chamber B22a is arranged radially inside the first actuating chamber B12a. The first actuating chamber B12a, the second actuating chamber B22a, and the third actuating chamber B32a are arranged radially without overlap. The first actuating chamber B12a, the second actuating chamber B22a, and the third actuating chamber B32a are arranged axially at least partially overlapping. The first actuating chamber B12a, the second actuating chamber B22a, and the third actuating chamber B32a are arranged at least substantially in the same axial extension range.

The first actuating chamber B12a has a first boundary wall 18a on a side facing away from the first power transmission region K13a in the axial direction. The first boundary wall 18a is arranged concentrically with respect to the main axis of rotation 14a. The first boundary wall 18a is arranged at least substantially orthogonally to the main axis of rotation 14a. The first boundary wall 18a is at least substantially flat. The second actuating chamber B22a has a second boundary wall 20a on a side facing away from the second power transmission region K23a in the axial direction. The second boundary wall 20a is arranged concentrically with respect to the main axis of rotation 14a. The second boundary wall 20a is arranged at least substantially orthogonally to the main axis of rotation 14a. The second boundary wall 20a is at least substantially flat. The third actuating chamber B32a has a third boundary wall 22a on a side facing away from the third power transmission region K33a in the axial direction. The third boundary wall 22a is arranged at least substantially orthogonally to the main axis of rotation 14a. The third boundary wall 22a is at least substantially flat.

The first boundary wall 18a surrounds the second boundary wall 20a radially without overlap. The third boundary wall 22a surrounds the first boundary wall 18a radially without overlap. The first boundary wall 18a, the second boundary wall 20a, and the third boundary wall 22a are arranged on one plane. The first boundary wall 18a, the second boundary wall 20a, and the third boundary wall 22a are arranged radially adjacent to one another. The first boundary wall 18a, the second boundary wall 20a, and the third boundary wall 22a form a common boundary wall.

The first centrifugal oil chamber B13a, the second centrifugal oil chamber B23a, and the third centrifugal oil chamber B33a are arranged radially stacked one on top of the other. The first centrifugal oil chamber B13a is arranged radially inside the third centrifugal oil chamber B33a. The second centrifugal oil chamber B23a is arranged radially inside the first centrifugal oil chamber B13a. The first centrifugal oil chamber B13a, the second centrifugal oil chamber B23a, and the third centrifugal oil chamber B33a are arranged radially without overlap. The first centrifugal oil chamber B13a, the second centrifugal oil chamber B23a, and the third centrifugal oil chamber B33a are arranged axially to at least partially overlap. The first centrifugal oil chamber B13a, the second centrifugal oil chamber B23a, and the third centrifugal oil chamber B33a are arranged at least substantially in the same axial extension range.

Furthermore, the hybrid dual-clutch transmission 10a comprises a plurality of sealing elements, two sealing elements 52a, 54a of the second actuating unit B2a of which are provided with a reference numeral in FIG. 1 as an example. The sealing elements are provided to seal gaps between components of the actuating units B1a, B2a, and B3a with respect to an actuating oil. Likewise, the centrifugal oil chambers are sealed by means of further sealing elements.

The hybrid dual-clutch transmission 10a has a plate unit 24a. The plate unit 24a is arranged concentrically with respect to the main axis of rotation 14a. The drive element 16a radially surrounds the plate unit 24a. The drive element 16a is arranged axially overlapping and radially surrounding the plate unit 24a. The plate unit 24a has the first boundary wall 18a, the second boundary wall 20a, and the third boundary wall 22a. The first boundary wall 18a, the second boundary wall 20a, and the third boundary wall 22a are each formed as a plate segment of the plate unit 24a.

The hybrid dual-clutch transmission 10a comprises a shaft W4a. The shaft W4a is arranged coaxially to the main axis of rotation 14a. The shaft W4a is non-rotatably connected to the plate unit 24a. The first actuating oil flow 40a is supplied to the first actuating unit B1a via the shaft W4a and the plate unit 24a. The first centrifugal oil flow 42a is supplied to the first actuating unit B1a via the shaft W4a and the plate unit 24a. The second actuating oil flow 44a is supplied to the second actuating unit B2a via the shaft W4a. The second centrifugal oil flow 46a is supplied to the second actuating unit B2a via the shaft W4a. The third actuating oil flow 48a is supplied to the third actuating unit B3a via the shaft W4a and the plate unit 24a. The third centrifugal oil flow 50a is supplied to the third actuating unit B3a via the shaft W4a and the plate unit 24a. The first centrifugal oil flow 42a, the second centrifugal oil flow 46a, the third centrifugal oil flow 50a and a cooling oil flow for the clutches, which is not depicted in the drawing, run in the shaft W4a.

The hybrid dual-clutch transmission 10a has a cylinder unit 34a arranged concentrically with respect to the main axis of rotation 14a. The cylinder unit 34a is formed on a radially outer side as the first inner lamella carrier K11a of the first clutch K1a. The cylinder unit 34a is formed on a radially inner side as the second outer lamella carrier K22a of the second clutch K2a. The cylinder unit 34a is connected to the plate unit 24a in a material-locking, positive-locking and/or force-fitting manner. The cylinder unit 34a is preferably formed in one piece. The cylinder unit 34a is radially non-rotatably connected to the plate unit 24a in a region between the first boundary wall 18a and the second boundary wall 20a. The third outer lamella carrier K32a is non-rotatably connected to the cylinder unit 34a via the plate unit 24a.

FIG. 2 shows a schematic sectional depiction of the plate unit 24a in the first exemplary embodiment. The plate unit 24a has a round and flat shape. The plate unit 24a is formed in one piece. The plate unit 24a is preferably formed as a forged component. The plate unit 24a is provided for radial distribution of at least one actuating oil and/or at least one centrifugal oil.

The plate unit 24a has a first oil channel 26a. The first oil channel 26a is provided to supply the first actuating oil to the first actuating chamber B12a. The first oil channel 26a extends in a radial direction within the plate unit 24a. The first oil channel 26a is partially configured as a first radial bore. The plate unit 24a has a first inlet opening 56a. The first inlet opening 56a is connected to the first oil channel 26a. The first inlet opening 56a is formed by an axial bore projecting into the first radial bore. The first inlet opening 56a is provided to introduce the first actuating oil from the shaft W4a into the first oil channel 26a. The plate unit 24a has a first outlet opening 58a. The first outlet opening 58a is provided to connect the first oil channel 26a to the first actuating chamber B12a. The first outlet opening 58a is formed by an axial bore projecting into the first radial bore. The first outlet opening 58a is arranged on a side, in particular a front side, of the plate unit 24a opposite the first inlet opening 56a. The first oil channel 26a is formed from the first radial bore and from two further axial bores. The plate unit 24a has a first closing element 60a. The first closing element 60a is provided to close the first oil channel 26a at a radially outer opening of the first oil channel 26a.

The plate unit 24a has a third oil channel 30a. The third oil channel 30a is provided for supplying the third actuating oil to the third actuating chamber B32a. The third oil channel 30a extends in a radial direction within the plate unit 24a. The third oil channel 30a is partially configured as a third radial bore. The plate unit 24a has a third inlet opening 62a. The third inlet opening 62a is connected to the third oil channel 30a. The third inlet opening 62a is formed by an axial bore projecting into the third radial bore. The third inlet opening 62a is provided for introducing the third actuating oil from the shaft W4a into the third oil channel 30a. The plate unit 24a has a third outlet opening 64a. The third outlet opening 64a is provided to connect the third oil channel 30a to the third actuating chamber B32a. The third outlet opening 64a is formed by an axial bore projecting into the first radial bore. The third outlet opening 64a is arranged on a side, in particular a front side, of the plate unit 24a opposite the third inlet opening 62a. The third oil channel 30a is formed from the third radial bore and from two further axial bores. The plate unit 24a has a third closing element 66a. The third closing element 66a is provided to close the third oil channel 30a at a radially outer opening of the third oil channel 30a.

The plate unit 24a has a radially extending centrifugal channel 32a. The centrifugal channel 32a is provided to supply a centrifugal oil to the first centrifugal oil chamber B13a and the third centrifugal oil chamber B33a. The centrifugal channel 32a is partially configured as a fourth radial bore. The plate unit 24a has a fourth inlet opening 68a. The fourth inlet opening 68a is connected to the centrifugal channel 32a. The fourth inlet opening 68a is formed by an axial bore projecting into the fourth radial bore. The fourth inlet opening 68a is provided for introducing the first centrifugal oil and the third centrifugal oil from the shaft W4a into the centrifugal channel 32a. The plate unit 24a has a fourth outlet opening 70a. The fourth outlet opening 70a is provided to connect the centrifugal channel 32a to the first centrifugal oil chamber B13a. The fourth outlet opening 70a is formed by an axial bore projecting into the first radial bore. The plate unit 24a has a fifth outlet opening 72a. The fifth outlet opening 72a is provided to connect the centrifugal channel 32a to the third centrifugal oil chamber B33a. The fifth outlet opening 72a is formed by an axial bore projecting into the first radial bore. The centrifugal channel 32a is formed from the fourth radial bore and from three further axial bores. The plate unit 24a has a fourth closing element 74a. The fourth closing element 74a is provided to close the centrifugal channel 32a at a radially outer opening of the centrifugal channel 32a.

On a side facing away from the internal combustion engine 12a, the plate unit 24a has three radially extending thicker sections, which are not depicted in more detail. The thicker sections are provided to receive at least the radial bores.

FIG. 3 shows a second exemplary embodiment of a plate unit 24b for the hybrid dual-clutch transmission 10a according to the invention. The following descriptions are substantially limited to the differences between the exemplary embodiments, wherein reference can in principle also be made to the drawings and/or the description of the other exemplary embodiment, in particular, of FIGS. 1 and 2, with regard to components with the same designation, in particular with regard to components with the same reference numerals. To distinguish between the exemplary embodiments, the letter a is placed after the reference numerals of the exemplary embodiment in FIGS. 1 and 2. In the exemplary embodiment of FIG. 3, the letter a is replaced by the letter b.

FIG. 3 shows a schematic sectional depiction of the plate unit 24b in the second exemplary embodiment. The plate unit 24b is arranged concentrically with respect to the main axis of rotation 14b. The plate unit 24b has a round and flat shape. The plate unit 24b is formed in one piece. In particular, the plate unit 24b is formed as a forged component. The plate unit 24b is provided for radial distribution of at least one actuating oil and/or at least one centrifugal oil. The plate unit 24b has a first boundary wall 18b, a second boundary wall 20b and a third boundary wall 22b.

The plate unit 24b has a first oil channel 26b. The first oil channel 26b is partially configured as a first radial bore. The plate unit 24b has a first inlet opening 56b. The plate unit 24b has a first outlet opening 58b.

The plate unit 24b has a second closing element 60b provided to close the first oil channel 26b at a radially outer opening.

The plate unit 24b has a second oil channel 28b. The second oil channel 28b is provided to supply an actuating oil to the second actuating chamber B22a. The second oil channel 28b extends in a radial direction within the plate unit 24b. The second oil channel 28b is partially configured as a second radial bore. The plate unit 24b has a second inlet opening 76b. The second inlet opening 76b is connected to the second oil channel 28b. The second inlet opening 76b is formed by an axial bore projecting into the second radial bore. The second inlet opening 76b is provided to introduce the second actuating oil from the shaft W4a into the second oil channel 28b. The plate unit 24b has a second outlet opening 78b. The second outlet opening 78b is provided to connect the second oil channel 28b to the second actuating chamber B22a. The second outlet opening 78b is formed by an axial bore projecting into the second radial bore. The second oil channel 28b is formed from the second radial bore and from two further axial bores. The plate unit 24b has a second closing element 80b. The second closing element 80b is provided to close the second oil channel 28b at a radially outer opening of the second oil channel 28b.

The plate unit 24b has a third oil channel 30b. The third oil channel 30b is partially formed as a third radial bore. The plate unit 24b has a third inlet opening 62b. The plate unit 24b has a third outlet opening 64b. The plate unit 24b has a radially extending centrifugal channel 32b. The centrifugal channel 32b is partially configured as a fourth radial bore. The plate unit 24b has a fourth inlet opening 68b. The plate unit 24b has a fourth outlet opening 70b. The plate unit 24b has a fifth outlet opening 72b.

The axial bores of the first outlet opening 58b, the second outlet opening 78b, the third outlet opening 64b, the fourth outlet opening 70b and the fifth outlet opening 72b penetrate the plate unit 24b in the depicted viewing plane.

On a side facing away from an internal combustion engine 12b, the plate unit 24b has four radially extending thicker sections which are not depicted in more detail. The thicker sections are provided to surround at least the radial bores.

The third oil channel 30b has a third closing element 66b at a radially outer opening.

The centrifugal channel 32b has a fourth closing element 74b at a radially outer opening.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE NUMERALS 10 hybrid dual-clutch transmission
11 dual-clutch transmission
12 internal combustion engine
13 electric motor
14 main axis of rotation
15 rotor
16 drive gearwheel
17 dual clutch
18 first boundary wall
19 housing
20 second boundary wall
22 third boundary wall
24 plate unit
26 first oil channel
28 second oil channel
30 third oil channel
32 centrifugal channel
34 cylinder unit
36 dual mass flywheel
38 bearing
40 first actuating oil flow
42 first centrifugal oil flow
44 second actuating oil flow
46 second centrifugal oil flow
48 third actuating oil flow
50 third centrifugal oil flow
52 sealing element
54 sealing element
56 first inlet opening
58 first outlet opening
60 first closing element
62 third inlet opening
64 third outlet opening
66 third closing element
68 fourth inlet opening
70 fourth outlet opening
72 fifth outlet opening
74 fourth closing element
76 second inlet opening
78 second outlet opening
80 second closing element
B1 first actuating unit
B11 first actuating piston
B12 first actuating chamber
B13 first centrifugal oil chamber
B2 second actuating unit
B21 second actuating piston
B22 second actuating chamber
B23 second centrifugal oil chamber
B3 third actuating unit
B31 third actuating piston
B32 third actuating chamber
B33 third centrifugal oil chamber
K1 first clutch
K11 first inner lamella carrier
K12 first outer lamella carrier
K13 first power transmission region
K14 first inner lamellae
K15 first outer lamellae
K2 second clutch
K21 second inner lamella carrier
K22 second outer lamella carrier
K23 second power transmission region
K24 second inner lamellae
K25 second outer lamellae
K3 third clutch
K31 third inner lamella carrier
K32 third outer lamella carrier
K33 third power transmission region
K34 third inner lamellae
K35 third outer lamellae
W1 first input shaft
W2 second input shaft
W3 drive shaft
W4 shaft

The invention claimed is:

1. A hybrid dual-clutch transmission, comprising:
a dual-clutch transmission, which comprises a dual clutch having a first clutch and a second clutch, wherein the first clutch has a first actuating chamber, a first centrifugal oil chamber, a first power transmission region, a first inner lamella carrier, and a first outer lamella carrier, wherein the second clutch has a second actuating chamber, a second centrifugal oil chamber, a second power transmission region, a second inner lamella carrier, and a second outer lamella carrier, wherein a first secondary side of the first clutch is coupled to a first countershaft sub-transmission, and a second secondary side of the second clutch is coupled to a second countershaft sub-transmission;

a drive shaft driveable by an internal combustion engine;

a third clutch comprising a third actuating chamber, a third centrifugal oil chamber, a third power transmission region, a third inner lamella carrier, and a third outer lamella carrier, wherein the third inner lamella carrier is non-rotatably connected to the drive shaft, and wherein the third outer lamella carrier is non-rotatably connected to a common primary side of the dual clutch;

an electric motor; and a drive element non-rotatably connected to the common primary side of the dual clutch, wherein the electric motor is connected to the drive element in such a way that torques, starting from the electric motor, are introduceable into the dual-clutch transmission exclusively via the drive element, wherein the first power transmission region, the second power transmission region, and the third power transmission region are arranged radially stacked one on top of the other and are axially at least partially overlapping, wherein the third clutch is arranged radially outwardly with respect to the first clutch and the second clutch, wherein the first clutch, the second clutch, and the third clutch are arranged coaxially with respect to a main axis of rotation, wherein the first actuating chamber, the second actuating chamber, and the third actuating chamber are arranged radially stacked one on top of the other, wherein the drive element is non-rotatably connected to the first inner lamella carrier, the second outer lamella carrier, and the third outer lamella carrier, wherein the first centrifugal oil chamber, the second centrifugal oil chamber, and the third centrifugal oil chamber are arranged radially stacked one on top of the other, and wherein the first centrifugal oil chamber, the second centrifugal oil chamber and the third centrifugal oil chamber are arranged axially at least partially overlapping.

2. The hybrid dual-clutch transmission of claim 1, wherein the first actuating chamber, the second actuating chamber, and the third actuating chamber are arranged axially at least partially overlapping.

3. The hybrid dual-clutch transmission of claim 1, wherein the first actuating chamber has a first boundary wall on a side facing away from the first power transmission region in the axial direction, the second actuating chamber has a second boundary wall on a side facing away from the second power transmission region in the axial direction, the third actuating chamber has a third boundary wall on a side facing away from the third power transmission region in the axial direction, the first boundary wall surrounds the second boundary wall radially without overlap, and the third boundary wall surrounds the first boundary wall radially without overlap.

4. The hybrid dual-clutch transmission of claim 3, further comprising:

a plate unit arranged concentrically with respect to the main axis of rotation and has the first boundary wall, the second boundary wall, and the third boundary wall.

5. The hybrid dual-clutch transmission of claim 4, wherein the plate unit has a first oil channel which is provided to supply an actuating oil to the first actuating chamber and which extends in a radial direction within the plate unit.

6. The hybrid dual-clutch transmission of claim 4, wherein the plate unit has a second oil channel, which is provided to supply an actuating oil to the second actuating chamber.

7. The hybrid dual-clutch transmission of claim 4, wherein the plate unit has a third oil channel which is provided to supply an actuating oil to the third actuating chamber and which extends in a radial direction within the plate unit.

8. The hybrid dual-clutch transmission of claim 4, wherein the plate unit has a radially extending centrifugal channel which is provided to supply a centrifugal oil to the first centrifugal oil chamber, the second centrifugal oil chamber, or the third centrifugal oil chamber.

9. The hybrid dual-clutch transmission of claim 4, wherein the drive element radially surrounds the plate unit and is arranged axially adjacent to or axially overlapping the plate unit.

10. The hybrid dual-clutch transmission of claim 4, further comprising:

a cylinder unit arranged concentrically with respect to the main axis of rotation, wherein the cylinder unit is formed on a radially outer side as the first inner lamella carrier of the first clutch and on a radially inner side as the second outer lamella carrier of the second clutch, wherein the cylinder unit is non-rotatably connected to the plate unit radially in a region between the first boundary wall and the second boundary wall.

* * * * *